Aug. 21, 1962     O. L. STEINBERG     3,049,970
LENS ADAPTER
Filed June 29, 1959

INVENTOR.
Otho L. Steinberg
BY
C. M. McKnight
ATTORNEY

3,049,970
LENS ADAPTER
Otho L. Steinberg, 4637 S. Quincy Place, Tulsa, Okla.
Filed June 29, 1959, Ser. No. 823,441
3 Claims. (Cl. 88—24)

This invention relates to improvements in photographic apparatus, and more particularly, but not by way of limitation, to a lens adapter for a camera whereby a picture may be rescreened for a reproduction thereof without the formation of a pattern on the reproduced picture.

In the photographic production of a picture, a plurality of small dots is normally produced on the finished picture due to the screening thereof in the photographic process. When a second picture is photographically reproduced from the first picture, a pattern is usually formed on the second picture which includes the small dots on the original picture in addition to the dots produced in the screening process in the second filming or reproduction operation. It will be apparent that the pattern thus formed on the reproduced picture is undesirable, and greatly detracts therefrom. The present invention contemplates a novel lens adapter for a camera particularly designed and constructed for elimination of the undesirable pattern on a picture reproduction. The novel lens adapter is utilized for breaking up the screening, or pattern of small dots on the first picture during the taking of the negative thereof, thus providing a clear negative and eliminating the two screenings on the reproduced or second picture. Thus, the reproduction is substantially as clear and desirable as the original picture.

It is an important object of this invention to provide an improved photographic apparatus for facilitating the rescreening of a picture.

It is another object of this invention to provide a novel lens adapter for a camera wherein a clear photographic negative may be produced from a picture by the elimination of the pattern of dots thereon.

Another object of this invention is to provide a novel lens adapter for a camera particularly designed and constructed to break up the pattern on a picture during the photographic reproduction thereof.

Still another object of this invention is to provide a novel lens adapter for a camera wherein a photographic reproduction may be provided in such a manner as to eliminate a double screening on the reproduced picture.

A further object of this invention is to provide a novel lens adapter for the rescreening of a picture which is simple and efficient in operation and economical and durable in construction.

Other objects and advantages of the invention will be evident from the following detailed description, read in conjunction with the accompanying drawings, which illustrate my invention.

Figure 1:
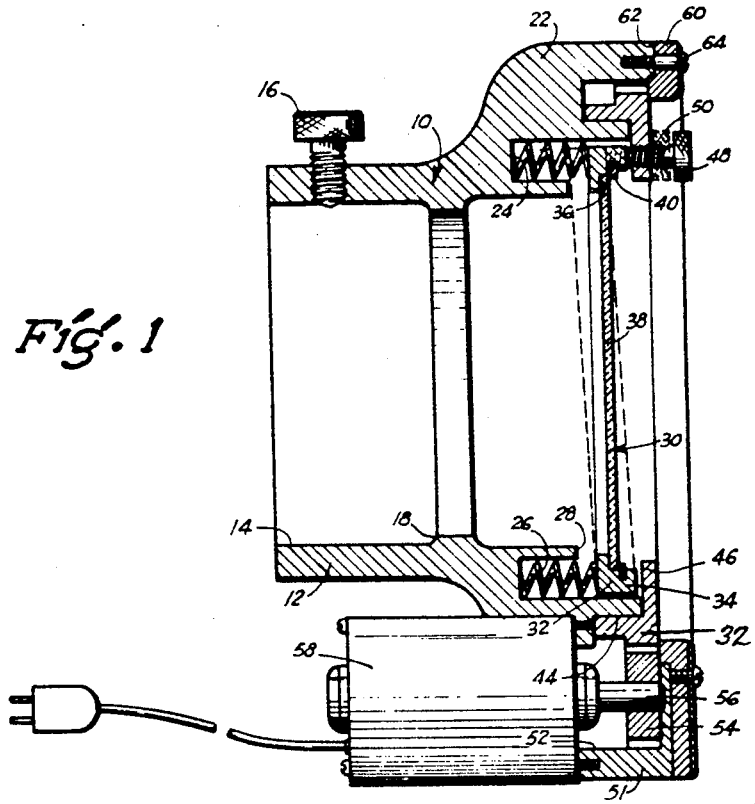
FIGURE 1 is a sectional side elevational view of a lens adapter embodying the invention.
Figure 2:
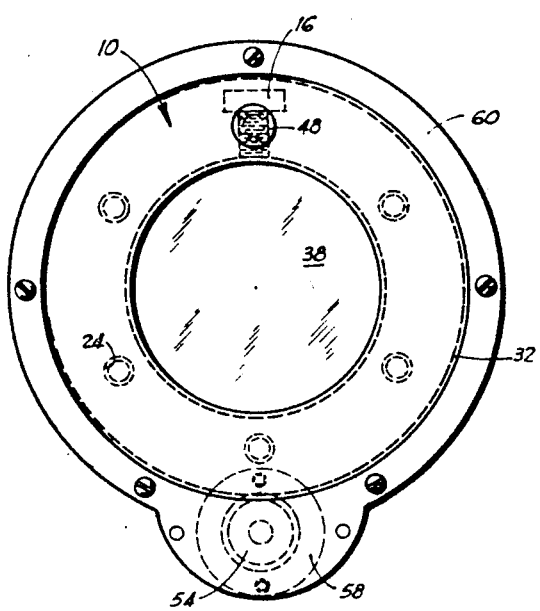
FIGURE 2 is a front elevational view of a lens adapter embodying the invention and with portions depicted in dotted lines for purposes of illustration.

Referring to the drawings in detail, reference character 10 refers in general to a lens adapter for a camera (not shown). The adapter 10 comprises a substantially cylindrical housing 12 having a longitudinal bore 14 therein for receiving the camera lens (not shown). A suitable mounting screw 16 extends transversely through the side wall of the housing 12 and into the bore 14 for bearing against the outer periphery of the lens to retain the adapter 10 securely on the camera, as is well known. An inwardly directed circumferential shoulder 18 is provided in the bore 14 and spaced from the open end 20 thereof to provide a stop for the lens and in order to facilitate positioning of the adapter 10 in alignment with the lens, as will be hereinafter set forth.

The housing 12 is enlarged at 22 and is provided with an internal annular groove 24 having a plurality of circumferentially spaced compression springs 26 disposed therein. An annular shoulder 28 is provided in the enlarged portion 22 adjacent the groove 24 for a purpose as will be hereinafter set forth. A light refracting glass unit or assembly 30 is loosely disposed in the enlarged portion 22 adjacent the springs 26 as clearly shown in FIG. 1, and retained thereagainst by a ring gear member 32. The refracting glass assembly 30 comprises an outer ring member 34 having an inwardly directed circumferential shoulder 36 for receiving a disc shaped refractory glass 38 thereagainst. The glass 38 is securely held adjacent the shoulder 36 by a suitable lock washer 40.

The ring gear 32 is of an annular configuration and is provided with a hub portion 42 disposed in a circular recess 44 provided in the enlarged portion 22 of the housing 12. The gear 32 is provided with an inwardly directed circumferential flange 46 which extends slightly beyond the ring member 34 for retaining the refracting glass assembly 30 in position adjacent the springs 26, as hereinbefore set forth. It will be apparent that the springs 26 constantly urge the assembly 30 axially outward against the flange 46. An adjusting screw 48 extends through a threaded aperture 50 provided in the flange 46 and bears against the ring 34 oppositely disposed from the springs 26. The screw 48 may be disposed or threaded in the aperture 50 as desired to overcome the action of a portion of the springs 26 in order to tilt the glass assembly 30 at substantially any desired angle with respect to the vertical, as viewed in the drawings, for a purpose as will be hereinafter set forth. The most extreme angle of tilt will be determined by the contact between the ring 34 and the shoulder 28, as depicted in dotted lines in FIG. 1.

An arcuate boss 51 is provided on the housing 12 adjacent the ring gear 32 and is provided with a recess 52 to receive a pinion gear 54 meshing with the ring gear 32. The pinion gear 54 is mounted or suitably secured to a drive shaft 56 of a motor 58, which is in turn bolted, or the like, to the boss 51. The ring gear 32 is secured in position by a flanged retaining ring 60 which is removably secured to the front face 62 of the body 12 by a plurality of spaced screws 64. Actuation of the motor 58 will rotate the drive shaft 56 for a simultaneous rotation of the pinion gear 54. The gear 54 drives the ring gear 32 for moving the screw 48 circumferentially around the ring 34 without rotating the glass assembly 30. The screw 48 will thus cause a progressive tilting of the glass assembly 30 as the ring gear 32 is rotated, but will not rotate the light refracting glass 38. As hereinbefore set forth, the angular tilting of the glass 38 may be pre-determined by the positioning of the screw 48 in the aperture 50 to provide the most desirable results during the photographic reproduction of the picture. The tilting of the glass 38 breaks up the pattern or moire on the picture being photographed.

*Operation*

When it is desired to make a photographic reproduction of a picture (not shown), the lens adapter 10 is disposed on the camera lens (not shown) in such a manner that the front of the camera lens is adjacent or in abutment with the internal shoulder 18, and the mounting screw 16 is threaded tightly against the outer periphery of the lens for securely retaining the adapter 10 thereon. This assures that the adapter 10 will be properly aligned with the camera lens to provide the most desirable results. The screw 48 is then manually positioned within the aperture 50 to provide the desired angular tilt for the light refracting glass 38 in accordance with the type of reproduction being made from the original picture, that is a reduction in size, or an enlargement in size thereof. For example, it is desirable to provide a substantially large angle of tilting from the vertical when making an enlargement of the original picture, while it is desirable to provide a substantially small angle of tilting in the making of a reduction of the original picture.

The motor 58 is then actuated in any well known manner (not shown) whereby the pinion gear 54 will drive the ring gear 32 with respect to the glass assembly 30. The rate of speed of rotation of the ring gear 32 is preferably constant throughout any degree of angular tilting of the glass assembly 30. However, it is to be understood that a variable speed drive therefor may be provided, if desired. As the gear 32 rotates, the screw 48 provides a progressive circular tilting of the refracting glass 38. The camera may then be operated in the usual manner for the taking of a photographic negative of the picture being reproduced. The progressive tilting of the glass 38 during the taking of the negative functions to break up the pattern of small dots or moire on the picture being photographed, and results in a substantially clear negative therefrom. The negative thus produced may then be processed in the usual manner, and the reproduction made therefrom will be free of a double screening effect.

It is important that the light refracting glass 38 does not rotate during the exposing of the photographic negative. This assures that there will be substantially no distortion of the original picture in the negative, but that only the pattern of small dots or moire thereon will be broken up to provide a clear negative for producing an improved reproduction of the original picture, whether making an enlarged reproduction thereof or a reduction thereof.

From the foregoing, it will be apparent that the present invention provides a novel lens adapter for a photographic camera wherein a reproduction of an original picture may be made without producing a double screening effect on the reproduced or finished product. The light refracting glass of the novel adapter is progressively tilted during the exposure of the photographic negative to break up the moire of the original picture, but the glass is not rotated, thus producing a substantially clear and undistorted negative from the original picture to provide a greatly improved reproduction therefrom. The novel lens adapter is simple and efficient in operation, and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A lens adapter comprising a housing, light refracting means loosely disposed in the housing, gear means including a gear ring for retaining the refracting means within the housing, resilient means provided in the housing for constantly urging the refracting means in a direction toward the gear ring, adjustable means carried by said gear ring and rotatable therewith for tilting the refracting means within the housing, and means cooperating with said last mentioned means for rotation around the outer portion of the refracting means to provide a progressive tilting of the refracting means without rotation thereof, said adjustable means being brought into contact with the refracting means for progressively tilting said refracting means to a predetermined tilt-position thereof.

2. A lens adapter comprising a housing, light refracting means loosely disposed in the housing, gear means including a gear ring for retaining the light refracting means within the housing, resilient means provided in the housing for constantly urging the refracting means in a direction toward the gear ring, adjustable means carried by the said gear ring and rotatable therewith for acting against the resilient means to tilt the refracting means within the housing, means provided within the housing for limiting the tilting of the refractory means in one direction, and means cooperating with said last mentioned means for movement around the circumference of the refracting means to provide a progressive circular tilting of said refracting means without rotation thereof, said adjustable means being brought into contact with the refracting means for progressively tilting said refracting means to a predetermined tilt-position thereof.

3. A lens adapter comprising a housing, light refracting means loosely disposed within the housing, gear means disposed within the housing said gear means including a gear ring for retaining the refracting means within the housing and a driving gear for transmitting rotation to the gear ring, a plurality of spaced spring members disposed within the housing for urging the refracting means in a direction toward the gear means, means for rotating the gear means with respect to the refracting means, screw means extending through the gear ring into contact with the refracting means, said screw means adjustable to provide variable angular tilting of the refracting means against the action of the spring means, means provided within the housing for limiting the angular tilting of the refracting means in one direction, said screw means being rotatable with the gear ring for movement around the circumferential portion of the refracting means for providing a progressive circular tilting of the refracting means without rotation thereof upon rotation of the gear means, said screw means being brought into contact with the refracting means for progressively tilting the said refracting means to a predetermined tilt-position thereof.

References Cited in the file of this patent

UNITED STATES PATENTS

| | | |
|---|---|---|
| 2,233,441 | Whittaker | Mar. 4, 1941 |
| 2,682,804 | Clifford et al. | July 6, 1954 |
| 2,776,595 | Schumacher | Jan. 8, 1957 |
| 2,792,741 | Mazzon | May 21, 1957 |
| 2,897,717 | Farrington | Aug. 4, 1959 |

FOREIGN PATENTS

| | | |
|---|---|---|
| 574,772 | Germany | Apr. 20, 1933 |
| 887,622 | France | Aug. 16, 1943 |